(12) United States Patent
Spalding et al.

(10) Patent No.: US 11,040,507 B2
(45) Date of Patent: Jun. 22, 2021

(54) ASSEMBLY AND METHOD TO REPAIR THERMOPLASTIC COMPOSITES

(71) Applicant: The Boeing Company, Chicago, IL (US)

(72) Inventors: John F. Spalding, Seattle, WA (US); Marc R. Matsen, Seattle, WA (US); Larry Dean Ridgeway, Snohomish, WA (US); Landon K. Henson, Snoqualmie, WA (US)

(73) Assignee: THE BOEING COMPANY, Chicago, IL (US)

( * ) Notice: Subject to any disclaimer, the term of this patent is extended or adjusted under 35 U.S.C. 154(b) by 33 days.

(21) Appl. No.: 16/675,788

(22) Filed: Nov. 6, 2019

(65) Prior Publication Data

US 2021/0129464 A1    May 6, 2021

(51) Int. Cl.
| | | |
|---|---|---|
| *B29C 73/34* | (2006.01) | |
| *B32B 37/06* | (2006.01) | |
| *B29C 65/00* | (2006.01) | |
| *B32B 37/18* | (2006.01) | |
| *B29C 35/08* | (2006.01) | |

(Continued)

(52) U.S. Cl.
CPC .............. *B29C 73/34* (2013.01); *B29C 65/32* (2013.01); *B29C 66/348* (2013.01);
(Continued)

(58) Field of Classification Search
CPC ......... B29C 65/00; B29C 65/02; B29C 65/18; B29C 65/245; B29C 65/32; B29C 66/347; B29C 66/3472; B29C 66/3474; B29C 66/348; B29C 66/41; B29C 66/43; B29C 66/73921; B29C 66/721; B29C 66/8223; B29C 66/828; B29C 2035/0811; B29C 73/34; B32B 37/06; B32B 37/16; B32B 37/18; B32B 37/182; B32B 37/10; B32B 2305/08; B32B 2310/0812; H05B 2206/02; H05B 2206/23; H05B 6/105; H05B 6/40
(Continued)

(56) References Cited

U.S. PATENT DOCUMENTS 4,961,799 A * 10/1990 Cologna ................. B29C 73/14
156/250
5,240,542 A    8/1993 Miller et al.
(Continued)

FOREIGN PATENT DOCUMENTS

FR    2985680 A1    7/2013

OTHER PUBLICATIONS

EP Search Report datedMar. 30, 2021 in re EP Application No. 20200027.9.

*Primary Examiner* — Philip C Tucker
*Assistant Examiner* — Brian R Slawski
(74) *Attorney, Agent, or Firm* — Coats & Bennett, PLLC

(57) ABSTRACT

An assembly to repair a thermoplastic composite. The assembly includes a heating device positioned on opposing sides of the thermoplastic composite. The heating device includes one or more susceptor with a Curie temperature to heat the thermoplastic composite. A pressure device applies a compressive force to the heating device. A pressure distribution device is positioned between the heating device and the thermoplastic composite. The pressure distribution device distributes the compressive force from the pressure device over areas of the opposing sides of thermoplastic composite.

20 Claims, 5 Drawing Sheets

(51) Int. Cl.
*B32B 37/10* (2006.01)
*B29C 65/32* (2006.01)

(52) U.S. Cl.
CPC ...... *B29C 66/3472* (2013.01); *B29C 66/3474* (2013.01); *B29C 66/43* (2013.01); *B29C 66/721* (2013.01); *B29C 66/73921* (2013.01); *B29C 66/8223* (2013.01); *B29C 2035/0811* (2013.01); *B32B 37/06* (2013.01); *B32B 37/10* (2013.01); *B32B 37/182* (2013.01); *B32B 2305/08* (2013.01); *B32B 2310/0812* (2013.01)

(58) Field of Classification Search
USPC ...... 156/60, 91, 92, 94, 98, 250, 252, 272.2, 156/272.4, 273.7, 308.2, 309.6, 349, 391, 156/423, 580, 583.1; 264/36.1, 258, 263
See application file for complete search history.

(56) References Cited

U.S. PATENT DOCUMENTS

| | | | |
|---|---|---|---|
| 5,635,094 A * | 6/1997 | Hansen | B29C 66/81455 219/633 |
| 6,323,468 B1 * | 11/2001 | Dabelstein | B29C 65/3644 219/603 |
| 9,581,146 B2 | 2/2017 | Shome et al. | |
| 9,993,946 B2 | 6/2018 | Matsen et al. | |
| 10,129,934 B2 | 11/2018 | Kestner et al. | |
| 10,219,329 B2 | 2/2019 | Matsen et al. | |
| 10,425,997 B2 | 9/2019 | Matsen et al. | |
| 2014/0356053 A1 * | 12/2014 | Urayama | B29C 65/564 403/270 |
| 2015/0231837 A1 * | 8/2015 | Georgeson | B29C 73/14 428/136 |
| 2017/0312943 A1 | 11/2017 | Ivy et al. | |

* cited by examiner

ASSEMBLY AND METHOD TO REPAIR THERMOPLASTIC COMPOSITES

TECHNOLOGICAL FIELD

The present disclosure relates generally to the field of thermoplastic composites and, more specifically, to the field of using susceptors with Curie temperatures to heat and repair thermoplastic composites.

BACKGROUND

Thermoplastic composites are used in a wide variety of contexts due to their strength and relative light weight. Examples include but are not limited to a variety of consumer products, building structures, and air, land, and water-based vehicles. One drawback to thermoplastic composites is the occurrence of delamination of the plies. One instance of delamination occurs when a hole is drilled or otherwise formed in the thermoplastic composite. Damaged thermoplastic structures have been difficult to repair.

Scarf-type repairs are one current method of repairing delaminated thermoplastic composites. Scarf repairs include removing the section of delaminated thermoplastic composite and replacing it with new material. To reduce the strains at the repair location, the new material is blended out to create a "scarf" joint. Scarf joints are typically done at a 30:1 taper ratio (i.e., for every unit of depth, the repair site is tapered out 30 units of width). This results in the removal of a large amount of undamaged thermoplastic composite that is in proximity to the repair location. For example, a one inch diameter delamination surrounding a fastener hole location in a 20-ply thick laminate would require removal of about a ten inch diameter around the fastener hole.

Scarf repairs also require an interfacial adhesive between the new material and the exposed thermoplastic material at the repair location. Using film adhesives with thermoplastic laminates requires special surface preparation methods to insure a strong bond. This includes an atmospheric plasma surface treatment that is difficult at least because the plasma processing parameters (standoff distance, rate of travel, overlap, impingement angle, etc.) are difficult to replicate without using robotics.

Scarf repairs also require a relatively high heat to consolidate the thermoplastic. Traditional heat blankets may not be capable of reaching the desired temperature. Further, managing the temperature delta across the repair area is challenging when using traditional heat blankets and can result in either under-heating or over-heating the new materials which would result in an unacceptable repair.

SUMMARY

One aspect is directed to an assembly to repair a thermoplastic composite. The assembly comprises a heating device comprising first and second heating elements positioned on opposing sides of the thermoplastic composite. The first heating element comprises a first susceptor in contact with a first conductor and the second heating element comprises a second susceptor in contact with a second conductor. The first and second susceptors each comprises a Curie temperature to heat and reconsolidate the thermoplastic composite. A pressure device applies a compressive force to the heating device. A pressure distribution device is positioned between the heating device and the thermoplastic composite. The pressure distribution device has a greater width measured along the thermoplastic composite than the heating device to distribute the compressive force from the pressure device over areas of the opposing sides of thermoplastic composite.

In another aspect, the pressure distribution device comprises a first member positioned between the first heating element and a first side of the thermoplastic composite and a second member positioned between the second susceptor and a second side of the thermoplastic composite with a width of each of the first and second members being greater than the heating device.

In another aspect, the first and second members comprise a tapered outer edge.

In another aspect, the pressure distribution device directly contacts against the heating device on each side of the thermoplastic composite.

In another aspect, the pressure device comprises a rod sized to extend through the thermoplastic composite with the first heating element and the first susceptor attached to the rod on a first side of the thermoplastic composite and the second heating element and the second susceptor attached to the rod on a second side of the thermoplastic composite.

In another aspect, the rod is constructed from a susceptor alloy and has a Curie temperature to heat the thermoplastic composite when the rod is heated by the heating device.

In another aspect, the Curie temperature of the first susceptor is different than the second susceptor.

In another aspect, washer stacks are positioned along the rod that apply a force to the first and second heating elements to maintain the compressive force.

One aspect is directed to an assembly to repair a thermoplastic composite. The assembly comprises a threaded rod and a nut threaded to the threaded rod on a first side of the thermoplastic composite and an attachment on the threaded rod on a second side of the thermoplastic composite. First and second members are positioned on the threaded rod with the first member positioned between the nut and the first side of the thermoplastic composite and the second member is positioned between the attachment and the second side of the thermoplastic composite. First and second heating elements are positioned on the threaded rod with the first heating element positioned between the nut and the first member and the second heating element positioned between the attachment and the second member with the first heating element comprising a first susceptor and a first conductor and the second heating element comprising a second susceptor and a second conductor. The first and second susceptors each comprise a Curie temperature to heat and reconsolidate the thermoplastic composite.

In another aspect, the first and second members comprise an inner side that contacts against the thermoplastic composite and an outer side that contacts the first and second heating elements respectively.

In another aspect, the first and second members comprise a width that is greater than the first and second heating elements.

In another aspect, the first susceptor contacts against the first conductor and the second susceptor contacts against the second conductor.

In another aspect, the nut is a first nut, and the attachment is a second nut that is threaded to the threaded rod.

In another aspect, the first heating element directly contacts against the first member and the second heating element directly contacts against the second member.

In another aspect, the threaded rod is constructed from a susceptor alloy that heats and reconsolidates the thermoplastic composite when heated by one or both the first and second heating elements.

One aspect is directed to a method of repairing a thermoplastic composite. The method comprises: compressing a delaminated section of the thermoplastic composite between a first member at the first side of the thermoplastic composite and a second member at a second side of the thermoplastic composite; inductively heating a first heating element that is positioned against the first member and a second heating element that is positioned against the second member with each of the first and second heating elements comprising a susceptor and a conductor in a stacked configuration and with each of the susceptors comprising a Curie temperature; transferring heat from the first heating element to the first member and from the second heating element to the second member; and heating the thermoplastic composite through the first and second members and reconsolidating the delaminated section.

In another aspect, the method comprises: positioning a threaded rod through an opening in the thermoplastic composite; applying a torque to a nut on the threaded rod; and applying a compressive force to the first and second heating elements and the first and second members.

In another aspect, the method comprises inductively heating the threaded rod to a corresponding Curie temperature and heating the thermoplastic composite with the threaded rod.

In another aspect, the method includes positioning the first and second members outward beyond the first and second heating elements respectively and creating a thermal transition zone along sections of the first and second members that extend outward beyond the first and second heating elements.

In another aspect, the method comprises positioning a first one of the susceptors directly against the first member and a second one of the susceptors directly against the second member.

The features, functions and advantages that have been discussed can be achieved independently in various aspects or may be combined in yet other aspects, further details of which can be seen with reference to the following description and the drawings.

DETAILED DESCRIPTION

Figure 1:
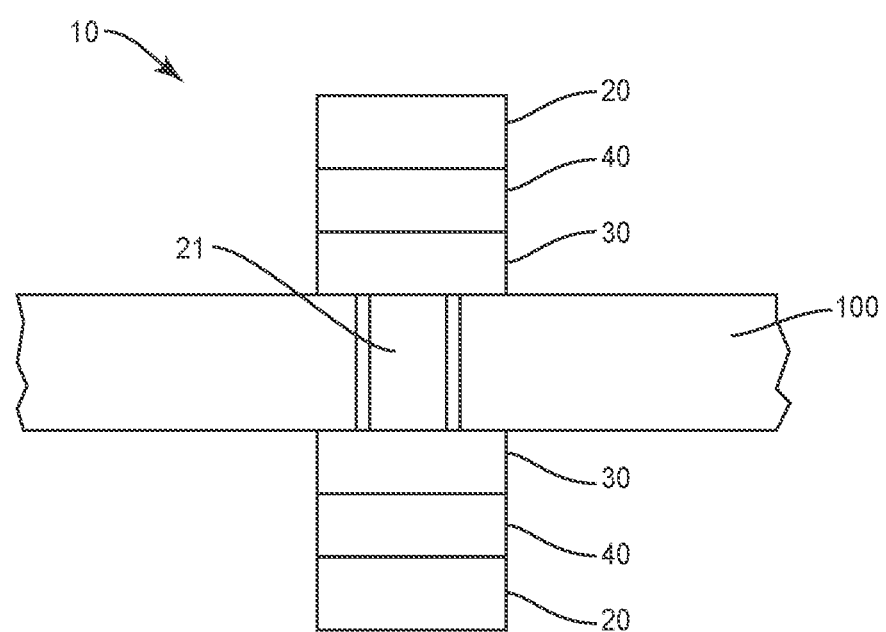
FIG. 1 is a side schematic view of an assembly that includes a pressure device, a pressure distribution device, and a heating device.

FIG. 1 illustrates a schematic view of an assembly 10 to repair a thermoplastic composite 100. The assembly 10 includes a heating device 40 that is positioned on opposing sides of the thermoplastic composite 100. The heating device 40 includes one or more susceptors with a Curie temperature to heat the thermoplastic composite 100. A pressure device 20 applies a compressive force to the heating device 40. A pressure distribution device 30 is positioned between the heating device 40 and the thermoplastic composite 100. The pressure distribution device 30 distributes the compressive force from the pressure device 20 over areas of the opposing first and second sides 101, 102 of thermoplastic composite 100.

Figure 2:
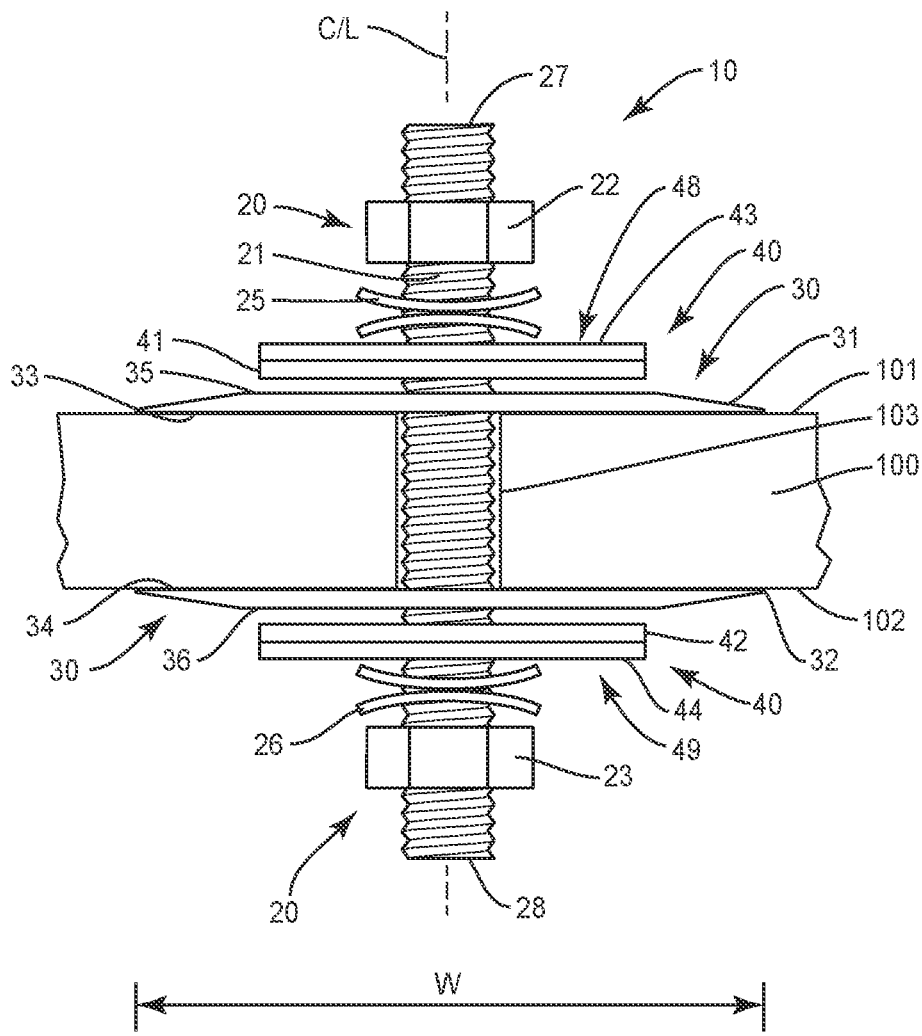
FIG. 2 is a side view of an assembly mounted to a thermoplastic composite.

The pressure device 20 is configured to apply a compressive force from opposing sides of the thermoplastic composite 100. As illustrated in FIG. 2, the pressure device 20 includes a rod 21 with a length to extend through the thermoplastic composite 100. The rod 21 includes a first end 27 positioned on the first side 101 of the thermoplastic composite 100 and a second end 28 positioned on the second side 102 of the thermoplastic composite 100. The rod 21 includes a centerline C/L. In one example, the rod 21 is threaded along the entire length between the first and second ends 27, 28. Other examples can include threads along one or more discrete sections of the length.

Attachments 22, 23 are connected to the rod 21. In one example, each of the attachments 22, 23 is a nut that is threaded onto the rod 21. The nuts can be rotated to apply the desired compressive force to the thermoplastic composite 100. In another example, one of the attachments 22, 23 is fixedly attached to the rod 21 and the other attachment 22, 23 is movably attached to the rod 21. A fixed attachment can include but is not limited to a head of the rod 21, or a washer or nut that is soldered or otherwise secured to the rod 21. In these examples, the pressure is applied by rotating and moving the movable nut along the rod 21 with the fixed attachment remaining stationary.

The pressure distribution device 30 comprises members 31, 32 that are positioned on opposing sides of the thermoplastic composite 100. The members 31, 32 each include an opening 37, 38 respectively that receives the rod 21. Each of the members 31, 32 includes a width W measured perpendicular to the centerline C/L of the rod 21. The width W is greater than a width of the heating device 40, and can be greater than a width of the attachments 22, 23. As illustrated in FIG. 2, the members 31, 32 can each include the same width W. Other examples include the members 31, 32 having different widths that are each greater than the heating device 40. One or both of the members 31, 32 can be coated with a release agent to allow for their removal after consolidation of the thermoplastic composite 100.

The first member 31 includes an inner side 33 that faces towards the thermoplastic composite 100 and an opposing outer side 35 that faces away from thermoplastic composite 100. Likewise, the second member 32 includes an inner side 34 and an outer side 36. The inner sides 33, 34 can be flat to facilitate contact with the thermoplastic composite 100. One or both of the members 31, 32 can have tapered outer edges. The tapered outer edges reduce the point load at the edge of the members 31, 32 once the pressure is applied. This reduces the possibility of the members 31, 32 becoming depressed into the thermoplastic composite 100 and causing a visible mark.

The large width of the first and second members 31, 32 distributes the pressure applied by the pressure device 20 over the repair area. The large size also creates a thermal transition zone beyond the outer edges of the heating device 40. The temperature at the outer sections of the members 31, 32 that extend radially outward beyond the heating device 40 are less than the temperature of the heating device 40.

This thermal gradient prevents marking the thermoplastic composite 100 by the first and second members 31, 32.

The pressure device 20 and pressure distribution device 30 can be constructed from non-ferrous alloys of low electrical conductivity. This construction minimizes unintended heating that could be caused by eddy current. In one example, the pressure device 20 and pressure distribution device 30 are constructed from titanium.

The heating device 40 heats the thermoplastic composite 100 above the consolidation temperature. The heating device 40 includes a first heating element 48 positioned on a first side of the thermoplastic composite 100, and a second heating element 49 positioned on a second side of the thermoplastic composite 100. The first and second heating elements 48, 49 include openings 46, 47 respectively that receive the rod 21.

The first heating element 48 includes a susceptor 41 and a conductor 43 that are stacked together. Likewise, the second heating element 49 includes a stacked susceptor 42 and a conductor 44. FIG. 2 includes the susceptors 41, 42 positioned towards the thermoplastic composite 100 and the conductors 43, 44 positioned away from the thermoplastic composite 100. The susceptors 41, 42 and conductors 43, 44 can also be stacked in an opposing orientation with the conductors 43, 44 in closer proximity to the thermoplastic composite 100 than the susceptors 41, 42. Each heating element 48, 49 can include the same or different stacking arrangement.

The susceptors 41, 42 provide self-leveling temperature control and are constructed from engineered ferrous alloys that have a Curie point that corresponds to the desired consolidation temperature of the thermoplastic composite 100. Examples include but are not limited to Kovar and Molly Permalloy. The Curie point is the temperature at which the ferrous alloy loses its magnetic properties and loses its ability to generate heat via magnetic hysteresis. Upon being heated to this temperature, the susceptors 41, 42 will generate just enough heat to compensate for thermal losses to the surrounding environment. In one example, the susceptors 41, 42 are constructed from engineered alloys with the Curie point matching the desired consolidation temperature. In another example, the Curie point can be above the desired consolidation temperature. In one example, the susceptors 41, 42 include a Curie point that is within 5° F. of the reconsolidation temperature of the thermoplastic composite 100. The susceptors 41, 42 can heat the thermoplastic composite 100 to various temperatures to provide for reconsolidation including but not limited to within a range of between about 350° F.-825° F.

The width of the susceptors 41, 42 measured perpendicular to the centerline C/L of the rod 21 can vary. In one example, the width is about 1.0 to 1.5 inches larger than the repair area. In one specific example with a hole having a 0.5 inch diameter and 0.25 inch delaminations, the width of the susceptors 41, 42 is about 3-4 inches.

The conductors 43, 44 are sized and shaped to contact against the susceptors 41, 42 respectively. Each of the conductors 43, 44 and susceptors 41, 42 can include flat surfaces that contact when stacked together. In one example as illustrated in FIG. 2, the susceptors 41, 42 include the same width as the conductors 43, 44. Other examples can include smaller or larger widths. The conductors 43, 44 can be fabricated from a non-ferrous, highly conductive alloy. One specific example includes copper. The high conductivity decreases the sensitivity of the susceptor 41, 42 to the orientation of the induction coil 110, 111 (see FIG. 6).

Washer stacks 25 are positioned between the attachments 22, 23 and the first and second heating elements 48, 49. The washer stacks 25 compensate for elongation of the rod 21 due to its coefficient of thermal expansion and maintain the desired pressure on the thermoplastic composite 100. The washer stacks 25 can include various structures, including but not limited to Belleville washers and springs.

The thermoplastic composites 100 are formed from plies of unidirectional fibers that are pre-impregnated with a thermoplastic matrix resin. The fibers can be formed from a variety of materials, including but not limited to aramids, polyolefins, metal, glass, carbon, boron, ceramic, mineral, and combinations. The thermoplastic matrix resin can be formed from a variety of substances, including but not limited to acrylics, fluorocarbons, polyamides (PA), polyethylenes (PE) such as polyethylene terephthalate (PET), polyesters, polypropylenes (PP), polycarbonates (PC), polyurethanes (PU), polyetheretherketones (PEEK), polyetherketoneketones (PEKK), polyetherimides (PEI), and other material compositions. The fibers in the different plies can have various orientations relative to one another to produce the desired strength. The plies can include a variety of thicknesses, with examples including but are not limited to thicknesses of between about 0.0025-0.0175 inches.

Figure 3:
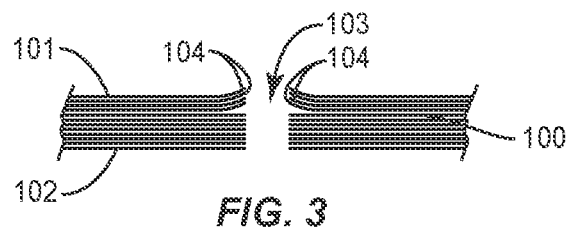
FIG. 3 illustrates a side view a hole in the thermoplastic composite that is delaminated.

FIGS. 3-6 illustrate the use of the assembly 10 to repair a delaminated thermoplastic composite 100. As illustrated in FIG. 3, the thermoplastic composite 100 includes an opening 103 that extends between first and second sides 101, 102. The delamination can occur at an opening 103 that is drilled or otherwise formed in the thermoplastic composite 100 after fabrication. The plies 104 at the opening 103 are delaminated thus requiring repair. In one example, no additional thermoplastic material is removed during the repair process. In another example, one or more portions of the delaminated material is removed and replaced in the scarf repair configuration providing the new material is within the effective heating area.

Figure 4:
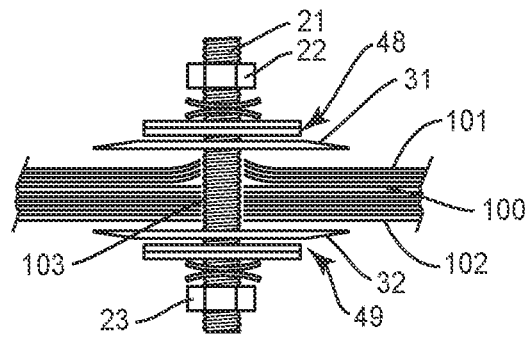
FIG. 4 is a side view of an assembly positioned in the hole of FIG. 3.

FIG. 4 illustrates the assembly 10 positioned within the opening 103. The rod 21 extends through the opening 103 and the first heating element 48 and first member 31 of the pressure distribution device 30 positioned at the first side 101. The second heating element 49 and second member 32 are positioned at the second side 102. In the arrangement of FIG. 4, the attachments 22, 23 are positioned along the rod 21 such that no pressure is being applied to the thermoplastic composite 100.

Prior to attachment of the assembly 10, the proper one or more alloys are chosen for the susceptors 41, 42. The proper selection provides for heating the thermoplastic composite 100 to the desired temperature at the desired power levels. Proper selection also avoids excessive heating of the thermoplastic composite 100 irrespective of the input power. The Curie temperature of the susceptors 41, 42 controls the absolute temperature of the thermoplastic composite 100. The use of susceptor alloys provides for improved control of the heating process and temperature uniformity in the thermoplastic composite 100 which results in more consistent repairs.

Figure 5:
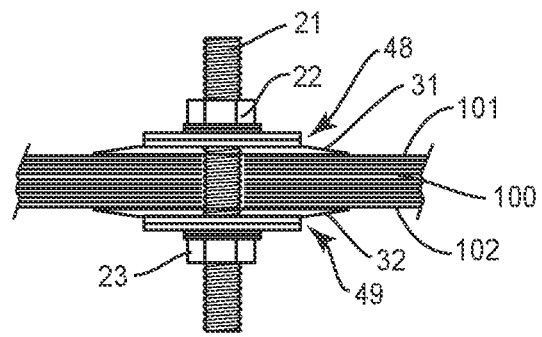
FIG. 5 is a side view of the assembly of FIG. 4 in a tightened configuration.

As illustrated in FIG. 5, one or both of the attachments 22, 23 are moved along the rod 21 to apply the desired amount of pressure to the thermoplastic composite 100. The first member 31 is in direct contact with the first side 101 of the thermoplastic composite 100 and the second member 32 is in direct contact with the second side 102 of the thermoplastic composite 100. In another example, a release film or distribution layer is positioned on one or both of the first and second sides 101, 102 such that one or both of the members 31, 32 do not directly contact against the thermoplastic composite 100.

The first heating element 48 is positioned in contact against the first member 31, and the second heating element 49 is positioned in contact against the second member 32. This can include the same or different stacking orientations of the susceptors 41, 42 and conductors 43, 44 on the first and second sides 101, 102 of the thermoplastic composite 100.

Figure 6:
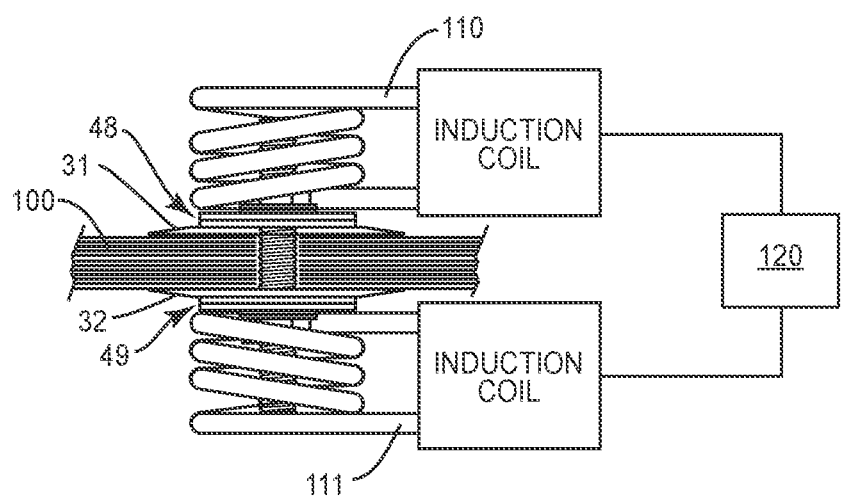
FIG. 6 is a side schematic view of the assembly of FIG. 5 with induction coils and a controller.

Once the desired pressure is applied to the thermoplastic composite 100, induction coils 110, 111 are placed over one or both exposed sections of the assembly 10. FIG. 6 illustrates induction coils 110, 111 placed over both exposed sections of the assembly 10. A controller 120 is attached to and controls the induction coils 110, 111.

Figure 7:
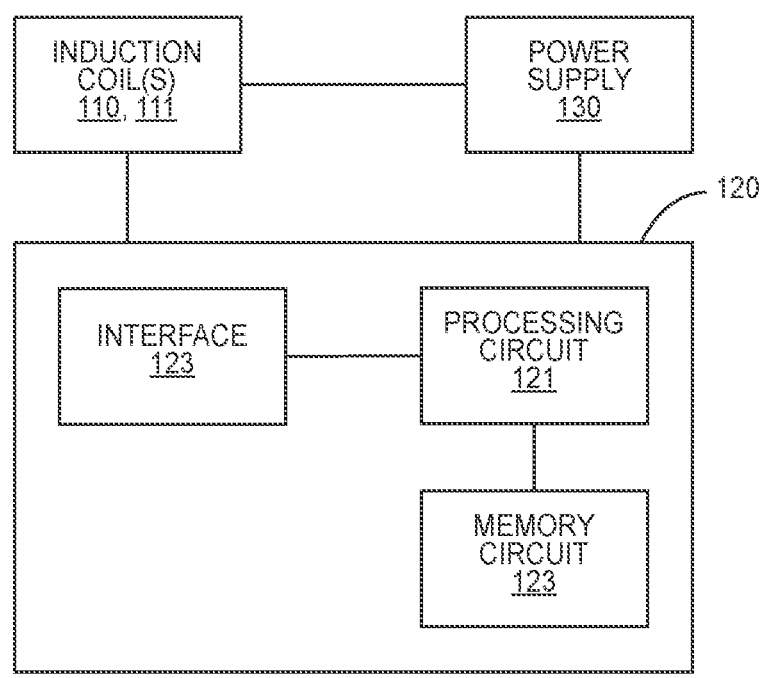
FIG. 7 is a schematic diagram of a controller operatively connected to a power supply and induction coils.

As illustrated in FIG. 7, the controller 120 includes a processing circuit 121 and a memory circuit 122. The processing circuit 121 controls the operation of the induction coils 110, 111 and/or power supply 130 according to program instructions stored in the memory circuit 122. Within examples, the processing circuit 121 includes one or more circuits, microcontrollers, microprocessors, hardware, or a combination thereof. Memory circuit 122 includes a non-transitory computer readable storage medium storing program instructions, such as a computer program product, that configures the processing circuit 121 to implement one or more of the techniques discussed herein. Memory circuit 122 can include various memory devices such as, for example, read-only memory, and flash memory. In one example, memory circuit 122 is a separate component as illustrated in FIG. 7. In another example, memory circuit 122 is incorporated with the processing circuit 121.

The controller 120 is configured to send and/or receive signals to a power supply 130 to control the power supplied to the induction coils 110, 111. Signals from the controller 120 can control the timing and supply of power from the power supply 130 to the induction coils 110, 111. FIG. 7 illustrates a single power supply 130 that provides electricity to the induction coils 110, 111. Other examples can include two or more separate power supplies that provide power to the induction coils 110, 111.

An interface 123 provides for a user to enter commands to the processing circuit 121 to control one or more aspects of the power supply 130 and/or the induction coils 110, 111. The interface 123 can include one or more displays for displaying information to the user and/or one or more input devices such as but not limited to a keypad, touchpad, roller ball, and joystick.

During the repair, the induction coils 110, 111 are heated based on electrical power supplied by the power supply 130. The induction coils 110, 111 heat the susceptors 41, 42 to their engineered operating temperature. When a section on the susceptors 41, 42 reaches its Curie temperature, heat output in that section is rapidly diminished. These sections generate just enough heat to maintain the susceptors 41, 42 engineered operating temperature. Other locations on the susceptors 41, 42 that have not reached its Curie temperature are still able to generate large amounts of heat until it also reaches its Curie temperature. This process provides for the application of uniform temperatures across the repair area of the thermoplastic composite 100.

The susceptors 41, 42 are further not able to be overheated by the induction coils 110, 111. Regardless of how much power is application, the use of Curie point control prevents overheating provided the correct susceptor alloy is used for the susceptors 41, 42.

In one example, the components of the heating device 40 are constructed from a solid alloy. This construction provides for no wire elements that can short circuit or break.

The thermoplastic composite 100 has a predetermined operating temperature. Temperature ranges of repair processes include but are not limited to a range of between about 350° F. to about 1950° F. In some examples, the temperature is maintained relatively constant for several minutes to several hours to complete the repair process. Other examples can include a longer duration of relatively constant temperature.

After the repair time is complete, the induction coils 110, 111 are removed. The pressure device 20 is loosened and removed from the thermoplastic composite 100. The heating device 40 and the pressure distribution device 30 are likewise removed thus leaving the repaired thermoplastic composite 100.

Figure 8:
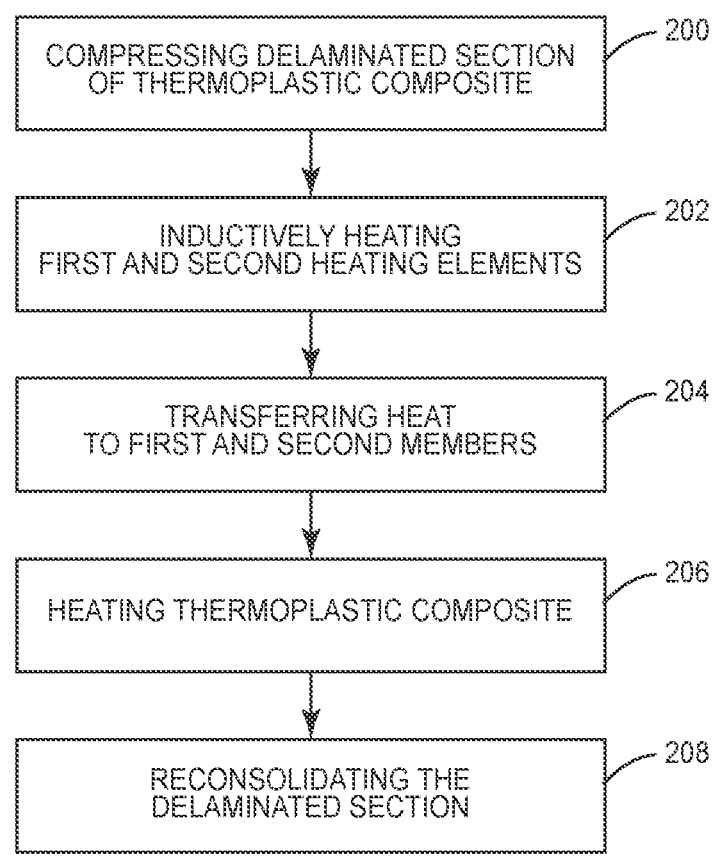
FIG. 8 is a flowchart diagram of a method of repairing a thermoplastic composite.

FIG. 8 illustrates a method of repairing a thermoplastic composite 100. The method includes compressing a delaminated section of the thermoplastic composite 100 (block 200). This includes compressing the thermoplastic composite between a first member 31 at the first side 101 of the thermoplastic composite 100 and a second member 32 at a second side 102 of the thermoplastic composite 100. The method includes inductively heating a first heating element 48 that is positioned against the first member 31 and a second heating element 49 that is positioned against the second member 32 (block 202). Heat is transferred from the first heating element 48 to the first member 31 and from the second heating element 49 to the second member 32 (block 204). The thermoplastic composite 100 is heated through the first and second members 31, 32 to the reconsolidation temperature (block 206). Heating the thermoplastic composite to this temperature reconsolidates the delaminated section (block 208).

One example of a reconsolidation profile for carbon-reinforced PEKK thermoplastic APC (PEKK-FC)/AS4D 12K 145/34:

a. Attach the assembly and apply between about 100-500 psi to the thermoplastic composite;
   b. Heat at any rate to between about 710° F.-800° F.;
   c. Maintain the pressure and heat for between about 15 minutes-30 minutes;
   d. Cool down at a rate of about less than or equal to 100° F./minute.
   In one example, Alloy 48 (48% nickel to iron) has a Curie point range of between about 700° F.-775° F.

In one example as illustrated in FIG. 2, the assembly 10 includes two susceptors 41, 42. Susceptor 41 is positioned at the first side 101 of the thermoplastic composite 100, and susceptor 42 is positioned at the second side 102 of the thermoplastic composite 100. The two susceptors 41, 42 can be constructed from the same or different susceptor alloys. Further, the susceptors 41, 42 can include the same or different Curie temperatures. In another example, the assembly 10 includes a single susceptor. This includes either susceptor 41 at the first side 101, or susceptor 42 at the second side 102.

In one example, the rod 21 is not a smart susceptor. The rod 21 can be constructed from various materials, including but not limited to various non-ferrous materials. In another example, rod 21 is constructed from a susceptor alloy and includes a Curie temperature. During the heating process, one or both of the induction coils 110, 111 cause the rod 21 to heat to its Curie temperature. The rod 21 thus causes heating and repair of the delaminated thermoplastic composite 100.

The thermoplastic composite 100 can be repaired while be used in a wide variety of contexts. One context includes the thermoplastic composite 100 forming a structure on a vehicle. One example of a vehicle is a commercial aircraft used for transporting passengers and/or cargo. One example of a vehicle structure is a wing or wing component of an aircraft. Other vehicles include but are not limited to unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

In the examples described above, the assembly 10 is used to reconsolidate thermoplastic composites. The assembly 10 can also be used to heat thermoset materials. In one example, the assembly 10 is used with a small scarf configuration surrounding a hole in the thermoset material. In another example, the assembly 10 is applied and used to cure potting compound that has been inserted to fill an oversized hole. During use with a thermoset material, the susceptors 41, 42 can be made from a material with a lower curie temperature than those used for thermoplastic materials.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An assembly to repair a thermoplastic composite, the assembly comprising:
   a heating device comprising first and second heating elements positioned on opposing sides of the thermoplastic composite, the first heating element comprising a first susceptor in contact with a first conductor and the second heating element comprising a second susceptor in contact with a second conductor, the first and second susceptors each comprising a Curie temperature to heat and reconsolidate the thermoplastic composite;
   a pressure device to apply a compressive force to the heating device; and
   a pressure distribution device positioned between the heating device and the thermoplastic composite, the pressure distribution device having a greater width measured along the thermoplastic composite than the heating device to distribute the compressive force from the pressure device over areas of the opposing sides of thermoplastic composite.

2. The assembly of claim 1, wherein the pressure distribution device comprises a first member positioned between the first heating element and a first side of the thermoplastic composite and a second member positioned between the second susceptor and a second side of the thermoplastic composite, the width of each of the first and second members being greater than the heating device.

3. The assembly of claim 2, wherein the first and second members comprise a tapered outer edge.

4. The assembly of claim 1, wherein the pressure distribution device directly contacts against the heating device on each side of the thermoplastic composite.

5. The assembly of claim 1, wherein the pressure device comprises a rod sized to extend through the thermoplastic composite with the first heating element and the first susceptor attached to the rod on a first side of the thermoplastic composite and the second heating element and the second susceptor attached to the rod on a second side of the thermoplastic composite.

6. The assembly of claim 5, wherein the rod is constructed from a susceptor alloy and has a Curie temperature to heat the thermoplastic composite when the rod is heated by the heating device.

7. The assembly of claim 6, wherein the Curie temperature of the first susceptor is different than the Curie temperature of the second susceptor.

8. The assembly of claim 5, further comprising washer stacks positioned along the rod that apply a force to the first and second heating elements to maintain the compressive force.

9. An assembly to repair a thermoplastic composite, the assembly comprising:
   a threaded rod;
   a nut threaded to the threaded rod on a first side of the thermoplastic composite and an attachment on the threaded rod on a second side of the thermoplastic composite;
   first and second members positioned on the threaded rod with the first member positioned between the nut and the first side of the thermoplastic composite and the second member positioned between the attachment and the second side of the thermoplastic composite; and
   first and second heating elements positioned on the threaded rod with the first heating element positioned between the nut and the first member and the second heating element positioned between the attachment and the second member, the first heating element comprising a first susceptor and a first conductor and the second heating element comprising a second susceptor and a second conductor, the first and second susceptors each comprising a Curie temperature to heat and reconsolidate the thermoplastic composite.

10. The assembly of claim 9, wherein the first and second members comprise an inner side that contacts against the thermoplastic composite and an outer side that contacts the first and second heating elements respectively.

11. The assembly of claim 10, wherein the first and second members comprise a width W that is greater than the first and second heating elements.

12. The assembly of claim 9, wherein the first susceptor contacts against the first conductor and the second susceptor contacts against the second conductor.

13. The assembly of claim 9, wherein the nut is a first nut, and the attachment is a second nut that is threaded to the threaded rod.

14. The assembly of claim 9, wherein the first heating element directly contacts against the first member and the second heating element directly contacts against the second member.

15. The assembly of claim 9, wherein the threaded rod is constructed from a susceptor alloy that heats and reconsolidates the thermoplastic composite when heated by one or both the first and second heating elements.

16. A method of repairing a thermoplastic composite, the method comprising:
   compressing a delaminated section of the thermoplastic composite between a first member at a first side of the thermoplastic composite and a second member at a second side of the thermoplastic composite;
   inductively heating a first heating element that is positioned against the first member and a second heating element that is positioned against the second member, each of the first and second heating elements comprising a susceptor and a conductor in a stacked configuration and with each of the susceptors comprising a Curie temperature;

transferring heat from the first heating element to the first member and from the second heating element to the second member; and heating the thermoplastic composite through the first and second members and reconsolidating the delaminated section.

17. The method of claim 16, further comprising:
positioning a threaded rod through an opening in the thermoplastic composite;
applying a torque to a nut on the threaded rod; and
applying a compressive force to the first and second heating elements and the first and second members.

18. The method of claim 17, further comprising inductively heating the threaded rod to a Curie temperature of the threaded rod and heating the thermoplastic composite with the threaded rod.

19. The method of claim 16, further comprising positioning the first and second members outward beyond the first and second heating elements respectively and creating a thermal transition zone along sections of the first and second members that extend outward beyond the first and second heating elements.

20. The method of claim 16, further comprising positioning a first one of the susceptors directly against the first member and a second one of the susceptors directly against the second member.

* * * * *